Patented Apr. 17, 1934

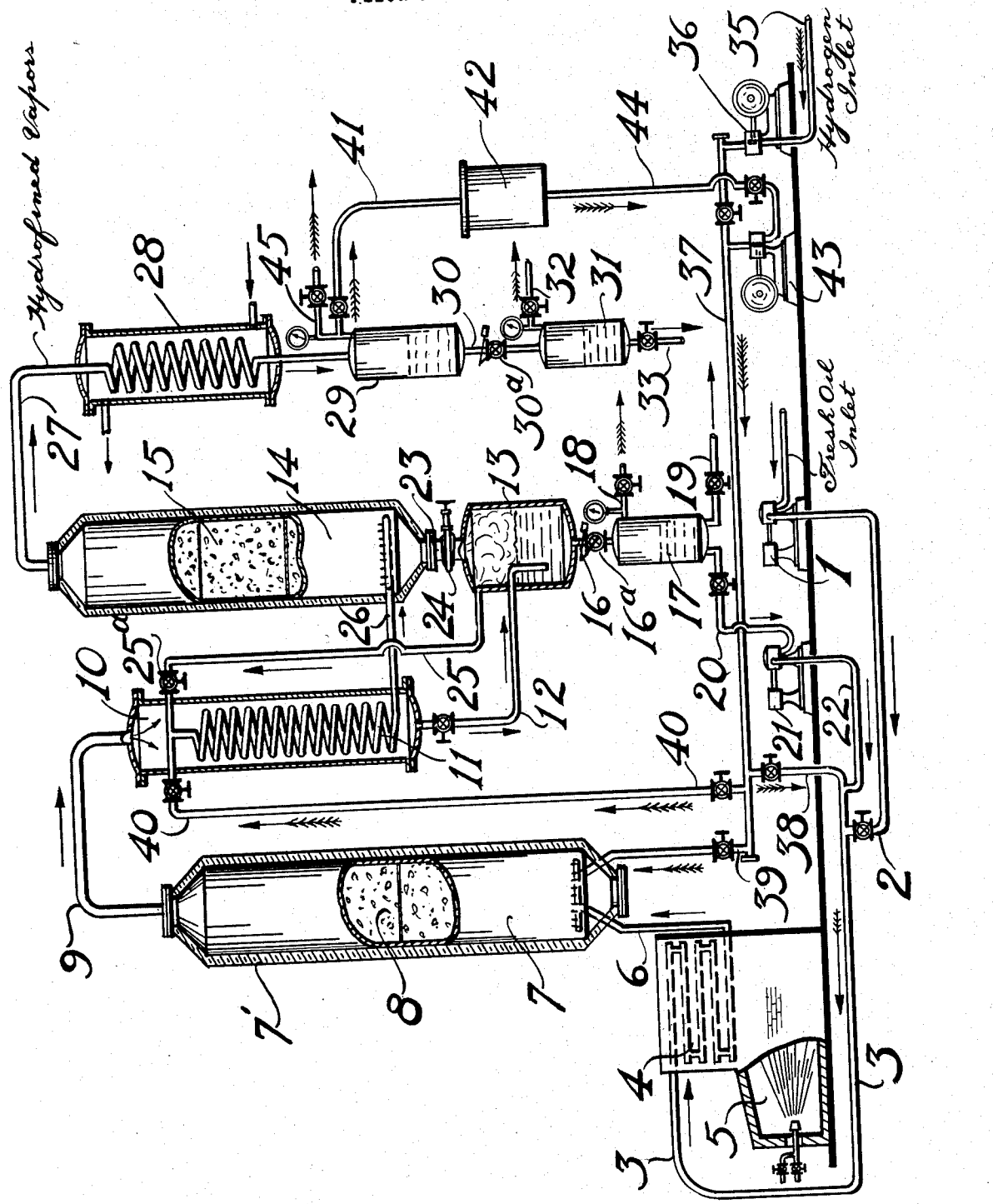

1,954,993

UNITED STATES PATENT OFFICE 1,954,993

PROCESS FOR PREPARING ANTIDETONATION MOTOR FUEL

Edwin J. Gohr, Elizabeth, N. J., assignor to Standard-I. G. Company

Application December 22, 1930, Serial No. 503,924

1 Claim. (Cl. 196—53)

This invention relates to the hydrogenation of hydrocarbon oils, and more specifically comprises a two-stage process of hydrocycliforming and hydrofining higher boiling hydrocarbons for the production of lower boiling hydrocarbons of marked anti-detonation characteristics especially suitable for motor fuel. My improved process will be fully understood from the following description and the drawing.

The drawing is a semi-diagrammatic view in sectional elevation of a suitable type of apparatus for accomplishing my process and indicates the flow of materials.

In the drawing, reference character 1 designates a pump which draws fresh oil from any suitable source (not shown) and forces it through lines 2 and 3 into coil 4 mounted in furnace setting 5 which is fired by gas or other means. The oil is heated in the coil to a temperature above about 850° F. and preferably to a temperature between about 900 and 980° F. or higher. Hot oil flows through line 6 and discharges into reactor 7 through a suitable series of openings. Reactor 7 is maintained under pressure in excess of 20 atmospheres preferably 100 or 200 atmospheres or higher and at temperatures in excess of about 900° F., preferably 925° F., 950° F., 1000° F. or higher, and is adapted to withstand these high temperatures and pressures, and is also resistant to attack by hydrogen and the reacting materials. Reactor 7 may be covered with a suitable insulating material 7', and preferably contains a catalytic material 8, the nature of which will be described below. The reactor is maintained at high temperature principally by the heat evolved in the hydrogenation of the oil and by the heat introduced with the hot oil, although it will be understood that additional heat may be furnished by other means as for example by electrical heaters (not shown) placed inside the reactor.

Hot vapors leave reactor 7 through line 9 and flow through cooler 10, wherein they are partially cooled by interchange of heat with cold hydrogen or vapors from the hydrofining zone, described below, which flow in heat interchange relationship with the hot vapors through coil 11.

The partially cooled vapors leave cooler 10 through line 12 and pass into chamber 13 which is the lower part of a second high pressure reaction zone 14. Reactor 14 is maintained under substantially the same pressure as reactor 7 and preferably contains a catalytic material 15 which may be the same as that in reactor 7 or of different composition. This reactor is preferably maintained at lower temperature than reactor 7 preferably between about 750 and 900° F.

Liquid products collect in chamber 13 from which they may be withdrawn through line 16 and passed thence into temporary storage drum 17 fitted with gas release line 18 and liquid drawoff line 19. Pressure may be partly or substantially reduced on the liquid at valve 16a before discharging into drum 17 if desirable. From drum 17 the liquid may be drawn through line 20 by pump 21 and forced through lines 22 and 3 into coil 4, and thence back to reactor 7. The quantity of liquid from drum 17 returned to the reactor may be continually varied in order to change the ratio of cycle oil to fresh oil in the mixed feed oil. Thus, all of the liquid or only a portion or even an additional amount admitted from an outside source may be recycled to the reactor.

Vaporous products pass into the upper chamber 14 of the second reaction zone through passageway 23, or may be by-passed through cooler 10 by closing valve 24 and passing the vapors through line 25, valve 25a, coil 11 in cooler 10 and line 26 and discharging into chamber 14 through a suitable series of openings.

Hydrofined vapors leave chamber 14 through line 27 and flow through cooler 28 into separating drum 29. Liquid products leave drum 29 through line 30, flow past pressure reduction valve 30a and discharge into collecting drum 31 fitted with gas outlet line 32, and liquid outlet line 33 through which the product may be withdrawn and sent to storage or to equipment for further treatment.

Hydrogen or a gas rich in free hydrogen is drawn through line 35 from any suitable holder (not shown) into compressor 36 which compresses it to a pressure in excess of 20 atmospheres, preferably 100 or 200 atmospheres or higher, and forces it into line 37 which has three branch lines 38, 39 and 40. Through line 38 hydrogen may flow into line 3 where it mixes with fresh oil before it passes through the heating coil 4. Through line 39 hydrogen may discharge directly into reactor 7, and through line 40 hydrogen may pass through coil 11 in cooler 10 and discharge through line 26 into the second reactor 14.

Uncondensed gases in separating drum 29 may contain a substantial quantity of free hydrogen which may be advantageously recirculated. These gases flow out of drum 29 through line 41, pass through gas purifier 42 wherein hydrogen sulfide, ammonia, and other impurities as well as uncondensed hydrocarbon gases principally methane, are removed by scrubbing with alkali, water or oil or a combination of any of them, and the purified gases flow thence into booster compressor 43 which recompresses them to reactor pressure and discharges them through line 44 into fresh hydrogen line 37, through which they may be returned to the system. Should it be desirable to release these gases without purification and recirculation this may be done through line 45.

Catalytic materials that may be used comprise the oxides or sulfides of metals of the II, IV and VI groups of the periodic system. I have found that the oxides or sulfides of chromium, molybdenum and tungsten, preferably in admixture with the oxides of zinc or magnesium, are especially suitable and are characterized by immunity to sulfur poisoning.

In the operation of my process any hydrocarbon fraction boiling above about 200° F. may be used as feed material, but gas oils, cycle oils and similar fractions are preferable. The fresh feed is first subjected to hydrocycliformation in reactor 7. This is accomplished under pressures of hydrogen in excess of 20 atmospheres and at temperature between about 900 and 1100° F., preferably in the presence of catalytic materials. In the hydrocycliforming zone the higher boiling hydrocarbons are largely broken down and are substantially converted to hydrocarbons boiling below about 450° F. The partial pressure of hydrogen and time of contact in the hydrocycliforming zone are regulated to limit as far as possible saturation of the hydrocarbons. When hydrocycliforming under total pressures of 200 atmospheres, for example, the partial pressure of hydrogen should be kept as low as possible but high enough to prevent coke formation, and the time of contact at a temperature of about 980° F. should be about 2 to 6 minutes.

The first or hydrocycliforming zone is primarily for the purpose of converting the high boiling hydrocarbons to low boiling hydrocarbons of high anti-detonation value and suitable for motor fuel.

The second or hydrofining zone is primarily for the purpose of purifying the low boiling hydrocarbons of sulfur, color-forming and gum-forming constituents, and to produce a finished, stable motor fuel. The hydrofining may be carried out under the same pressure as the hydrocycliforming or at lower pressures, and is preferably conducted at substantially lower temperatures, between about 750 and 900° F. for example. The time of contact in the hydrofining zone is preferably shorter than that in the hydrocycliforming zone. It is sufficient, however, to substantially eliminate the undesirable impurities without saturating the oil to any extent.

The high boiling hydrocarbons, unconverted in the hydrocycliforming zone, are separated from the lower boiling hydrocarbons before the latter are subjected to the hydrofining. This may be accomplished by partially cooling the vapors from the hydrocycliforming zone so that the heavier fractions will condense and will collect in the bottom chamber of the hydrofining zone from which the condensate can be withdrawn and returned to the hydrocycliforming without being subjected to the hydrofining.

The hydrofining may be carried out at higher partial pressures of hydrogen than the hydrocycliforming and in general, when the heavier fractions of the vapor have been condensed and removed the partial pressure of hydrogen in the remaining vapors will be higher. However, if it is desirable to increase it still further, more hydrogen may be admitted through line 26 after being preheated in coil 11 of heat interchanger 10. Likewise, the uncondensed vapors to be hydrofined may be maintained at suitable hydrofining temperature by by-passing them from chamber 13 through the heat interchanger, and by adding cold gas through line 40.

The catalytic material used in the hydrocycliforming zone may advantageously be a material of low hydrogenating activity, for example one containing tungsten, while that used in the hydrofining stage may be a strongly hydrogenating material, for example one containing molybdenum.

This invention is not limited by any theory of the mechanism of hydrocycliforming or hydrofining, nor by any specific data given for purpose of illustration, but is limited only by the following claim in which I wish to claim all novelty inherent in this invention.

I claim:

Improved process for producing motor fuels of superior anti-detonation qualities from higher boiling hydrocarbon oil which comprises the steps of subjecting the oil to destructive hydrogenation in a primary stage reaction zone at a temperature between 900° and 1100° F. under a partial pressure of hydrogen from about 20 to 150 atmospheres, sufficient to retard coke formation but to permit substantial unsaturation and, for a time sufficient to produce an unstable anti-detonation motor fuel, removing the products of reaction from the reaction zone, separating the light oil, boiling in the motor fuel range produced by such treatment, from heavier fractions and subjecting the light oil in a secondary stage to treatment with hydrogen at a temperature between 750° and 900° F. under increased partial pressure of hydrogen sufficient to cause substantial saturation of gum forming hydrocarbons and, for a time, sufficient only to free the oil from gum forming constituents, and to leave the oil in a substantially unsaturated condition.

EDWIN J. GOHR.